United States Patent
Stankevitch

(10) Patent No.: US 6,534,689 B1
(45) Date of Patent: Mar. 18, 2003

(54) PROCESS FOR THE CONVERSION OF WASTE PLASTICS TO PRODUCE HYDROCARBON OILS

(75) Inventor: Vladilen Stankevitch, Haifa (IL)

(73) Assignee: Pyrocat Ltd., Migdal Haemek (IL)

( * ) Notice: Subject to any disclaimer, the term of this patent is extended or adjusted under 35 U.S.C. 154(b) by 0 days.

(21) Appl. No.: 09/935,662

(22) Filed: Aug. 24, 2001

(51) Int. Cl.⁷ .................................................. C10G 1/10
(52) U.S. Cl. ....................................................... 585/241
(58) Field of Search ........................................ 585/241

(56) References Cited

U.S. PATENT DOCUMENTS

| | | | |
|---|---|---|---|
| 3,901,951 A | 8/1975 | Nishizaka | 260/669 R |
| 4,147,593 A | 4/1979 | Frischmuth et al. | 201/21 |
| 4,385,985 A | 5/1983 | Gross et al. | 208/113 |
| 4,514,285 A | 4/1985 | Niccum et al. | 208/148 |
| 5,136,117 A | 8/1992 | Paisley et al. | 585/241 |
| 5,364,995 A | 11/1994 | Kirkwood et al. | 585/241 |
| 5,386,070 A | 1/1995 | Evans et al. | 585/241 |
| 5,449,496 A | 9/1995 | Pontier et al. | 422/144 |
| 5,481,052 A | 1/1996 | Hardman et al. | 585/241 |
| 5,582,712 A | 12/1996 | Zinke et al. | 208/113 |
| 5,792,340 A | 8/1998 | Freel et al. | 280/127 |
| 5,821,395 A | 10/1998 | Price et al. | 585/241 |
| 5,843,377 A | 12/1998 | Fandel et al. | 422/144 |
| 5,895,827 A | 4/1999 | Takahashi et al. | 585/241 |
| 5,976,355 A | 11/1999 | Johnson et al. | 208/119 |

FOREIGN PATENT DOCUMENTS

| | | |
|---|---|---|
| CA | 2009021 | 1/1990 |
| EP | 0567292 | 8/1982 |
| EP | 0502618 | 9/1992 |
| EP | 0687692 | 12/1995 |
| JP | 52155603 | 12/1977 |
| JP | 006020520 | 1/1994 |

OTHER PUBLICATIONS

A new plastics recycling plant for the U.K.?—Chemical Engineering, Apr. 1998, p 23.
BP commercializes a thermal plastics–recycling route—Chemical Engineering, May 1992, p. 17.
Fouhy et al., Plastics Recycling's Diminishing Returns—Chemical Engineering, Dec. 1993, pp. 30–33.
Howard, Fluidized Bed Technology, Principles and Applications—Aldan Higler, Bristol and New York, 1989, Contents (p. V–VII).
Kastner et al., Recycle plastics into feedstocks—Hydrocarbon processing, May 1995, pp. 109–112.
Leidner, Plastics waste—Marsel Dekker, Inc., New York and Basel, 1981.
Plastics recycling struggles for profitability—Chemical Engineering, Aug. 1993, p. 23.
Romanov–Garcia, Plastics . . . Planning for the Future—Hydrocarbon Processing, Oct. 1993, p. 15.
Vogiatzis et al., Selected Applications of Ultra–rapid Fluidized (URF) Reactors: Ultrapyrolysis of Heavy Oils and Ultra–Rapid Catalytic Cracking, AIChE Symposium Series, No. 270, vol. 85, 1989, pp. 69–76.
Zhu et al., Cocurrent Downflow Circulating Fluidized Bed (Downer) Reactors—A State of the Art Review—The Canadian Journal of Chemical Engineering, vol. 73, Oct. 1995, p. 662–677.

*Primary Examiner*—Thuan D. Dang
(74) *Attorney, Agent, or Firm*—Blank Rome LLP

(57) ABSTRACT

A process for converting waste plastic into gasoline, diesel, fuel oil and the like using pyrolysis and catalytic cracking techniques.

11 Claims, 3 Drawing Sheets

PROCESS FOR THE CONVERSION OF WASTE PLASTICS TO PRODUCE HYDROCARBON OILS

FIELD OF THE INVENTION

The present process relates to a field of waste processing, and it can mainly be used to produce a gasoline, diesel and fuel oils of waste plastics by pyrolysis and catalytic cracking.

BACKGROUND OF THE INVENTION

Pyrolysis is the known process of thermal destruction of hydrocarbons in oxygen-free environment under temperature of 400–900° C. and small excess pressure. This process, for example, is widely used in petroleum refinery for obtaining low molecular monomers from naphtha, and it can used for waste plastics processing with fuels production as an alternative of its incineration or landfilling.

A number of operating condition variables affects the thermal destruction. These are so-called 3 T's: temperature, time (residence time) and turbulence (or mixing). It is possible to understand the turbulence as method of gas/solid (feedstock) contacting and conditions of mixing pyrolysis products together with gas. A degree of reduction in size has an essential effect. High temperature (700–900° C.) and short residence time (1 second and less) are used for obtaining great quantity of low molecular monomers from petroleum feedstock. It is an endothermic process demanding heat supply from outside.

At present it is known a method of waste plastics pyrolysis in a fluidized bed (Patents: JP.52155603A2, U.S. Pat. No. 3,901,951, EP0502618, U.S. Pat. No. 5,364,995, EP0567292 and U.S. Pat. No. 5,481,052; investigations of Prof. W. Kaminsky in Hamburg University). Grainy inert materials, for example, quartz, sand or ceramic crumb, are used for making a fluidized bed. This material can be used as a circulating heat carrier, being heated in a separate apparatus. A fluidizing agent is inert gas or circulating pyrolysis gas. Preliminary shredding a feedstock is necessary for this technology. A reactor is provided with equipment for a feedstock supply and withdrawing a possible solid residue. A gas stream (pyrolysis products and fluidizing gas) and particles of inert material, escaping from the location of a fluidized bed, are separated within a cyclone.

In comparison with other methods of waste plastics processing, for example, those carried out in the rotary kiln reactor and the shaft reactor, pyrolysis in a fluidized bed has the following advantages: design simplicity, compactness, no moving parts (for the kiln reactor), low operating cost and lower capital cost, the increase of products yields, the enhance of products quality. These advantages are associated with well-known properties of a fluidized bed: uniformity of temperature field without temperature gradients, (those gradients are typical for above-mentioned packed bed reactors), effective mass exchange and a possibility to use a circulating solid heat carrier.

However, fluidization technique has also its own disadvantages, when it is used for such chemical processes as pyrolysis requiring very short residence time. Among these disadvantages are:

Mixing feedstock in the whole volume of a fluidized bed,
Impossibility to ensure short contact time,
Back mixing of pyrolysis products.

A possibility of very short residence time is provided by pyrolysis carried out in an upflow tubular reactors (risers), in which circulating fine solid heat carrier is transported in delute phase with inert gas or circulating pyrolysis gas (Patents: U.S. Pat. Nos. 4,147,593, 5,136,117 and 5,792,340). Feedstock, heat carrier particles and transporting gas are delivered to the bottom of the riser. Pyrolysis products, fluidizing gas and circulating inert material particles are separated in a cyclone. This system is also named as a circulating fluidized bed. Risers enable essentially to reduce residence time in comparison with a fluidized bed. For example, transition from catalytic cracking of petroleum feedstock in a fluidized bed to catalytic cracking in a riser enable to reduce catalyst residence time from several minutes to several seconds. Also, conditions of feedstock/solid contacting get essentially better in a system, employing a riser.

However, conversion in a riser has its own disadvantage. A vector of gas velocity and a vector of particle gravity are directed to opposite directions. It creates the known "slip effect", when particle velocity relative to reactor walls falls behind gas velocity by terminal velocity. This circumstance reduces solid particles residence time in the reactor, and it promotes back mixing of solid particles and, respectively, of gas, which is observed at the reactor walls. Although, this mixing is considerably inferior in comparison with that in a fluidized bed.

This disadvantage is absent in a downflow tubular reactor, known under names: "downer", "downflow circulating fluidized bed", "downcomer"). In this reactor the above-mentioned vectors coincide. The main advantages of this type of configuration over riser reactors are a short residence time with a narrow residence time distribution, little or no solids back mixing, and lower pressure drops since gravity acts in the same direction as the flow stream. Feedstock and heat carrier particles are delivered to the top of the reactor from a packed or fluidized bed placed in a special section or a separate apparatus. After going out of the downer, Products and particles of a circulating solid heat carrier are separated in a cyclone. A method and a reactor are patented in connection with the fluid catalytic cracking process (FCC) (Patents: U.S. Pat. Nos. 4,385,985, 5,449,496, 5,843,377, 5,582,712). The expediency of using these reactors for ultrapyrolysis of organic feed is discussed in scientific papers.

However, the use of risers and downers for pyrolysis of mixed feed, components of which have various conversion velocity, or for pyrolysis of shredded feedstock with a large range of particles size, has a restriction since hard-converted or coarse particles can break through a reactor. Or, in this case, it is necessary to select a reaction volume for these components. First of all, it concerns the mixed plastics, composing the larger part of municipal solid waste and containing mainly of polyethylene, polypropylene, polyvinyl chloride and polystyrene. In this respect, a fluidized bed reactor enables to process a feedstock with wider range of conversion velocity distribution.

There are known attempts to solve this problem by step-by-step increasing waste plastics pyrolysis temperature, when lower temperature is established for pyrolysis of light-converted polymers. Then, this temperature is increased for pyrolysis of hard-converted polymers (Patents: U.S. Pat. Nos. 5,386,070, 5,895,827). increasing temperature on a next stage of pyrolysis can be achieved also with a delivery of a hot circulating solid heat carrier, as it is widely used for the FCC process including catalytic cracking in a downer (Patent: U.S. Pat. No. 4,514,285).

Potential presence of polyvinyl chloride is one more peculiarity of mixed plastics pyrolysis. Hydrogen chloride, effecting equipment corrosion, is evolved during such plastics pyrolysis. Two-stage processing is used in this case. At first, feed melting is carried out at temperature of 200–300° C. The evolved hydrogen chloride is delivered to an adsorber with calcium oxide or similar compound. Melted feed is subjected to a following pyrolysis (Patents: U.S. Pat. Nos. 3,901,951, 5, 821,395).

During pyrolysis of mixed plastics waste at respectively low temperature (480–590° C.), it is possible to yield about 85% of liquid hydrocarbons ($C_5$–$C_{40}$). These hydrocarbons are a good feed for following catalytic cracking since they do not consist of sulfur, basic nitrogen and such metals poisoning a catalyst as nickel and vanadium.

Methods of pyrolysis, described in the patents U.S. Pat. Nos. 5,481,052 and 5,821,395 of BP Chemicals, Ltd., England and the patent U.S. Pat. No. 5,976,355 of Stone & Webster Engineering Corp., USA are the nearest methods to the presented method. In the patents of BP Chemicals, Ltd., waste plastics pyrolysis is carried out in a fluidized bed. In the patent of Stone & Webster Engineering Corp., thermocatalytic conversion of hydrocarbon feedstock (catalytic cracking of oil feedstock) is carried out in a downflow tubular reactor named as a downflow riser reactor.

A general feature of the above-mentioned patents of BP Chemicals is the fact that pyrolysis of shredded or preliminary melted waste plastics is carried out in contact with grainy inert material, for example with sand, fluidized by oxidant-free gas including circulating pyrolysis gas. The process is conducted under temperature of 300–600° C. and under pressure. Solid particles, entrained from a fluidized bed, are caught in a cyclone and/or in a guard bed. According to U.S. Pat. No. 5,481,052, required heat is delivered in the reactor by any fluidizing gas. According to U.S. Pat. No. 5,821,395, this heat delivers by burnt pyrolysis gas by means of a tube heat exchanger placed inside of the fluidized bed. The patent U.S. Pat. No. 5,821,395 is intended, first, for pyrolysis of waste plastics containing chlorinated polymers, for example, polyvinyl chloride (PVC). The patent provides recovery of the hydrogen chloride in a packed bed adsorber of a proper grainy adsorbent, for example calcium oxide.

However, the above-discussed methods of waste plastics pyrolysis in a fluidized bed according to the patents U.S. Pat. Nos. 5,481,052 and 5,821,395 of BP Chemicals have the following disadvantages inherent in fluidized bed processes:

1. Impossibility to ensure short contacting time,
2. Back mixing pyrolysis products,
3. Nonuniformity of the fluidized bed, which is expressed in a presence of gas bubbles and particles clusters.

Pyrolysis of light converted feed requires short residence time up to milliseconds as it is accompanied by secondary reactions of condensation reducing a yield of valuable olefins and, respectively, increasing the yield of less valuable aromatic and high molecular hydrocarbons. Nonuniformity of a fluidized bed worsens the conditions of feed/catalyst particles contacting at catalytic cracking.

Besides, the methods according to the patents U.S. Pat. Nos. 5,481,052 and 5,821,395 of BP Chemicals have additional disadvantages:

1. Delivery of heat into a reactor is inefficient, and it has serious disadvantages in operation. For example, using an inner heat exchanger according to the methods of the patent U.S. Pat. No. 5,821,395 increases some more fluidized bed nonuniformity, and it is accompanied by heat exchanger erosion.
2. There is not possible to control feed residence time at its constant flow rate that reduces a technological flexibility of the process.

A method of hydrocarbon feed conversion in a downflow tubular reactor according to the patent U.S. Pat. No. 5,976,355 is deprived of these disadvantages but it has own disadvantages:

1. In case a use of polymers mixture with a different conversion rate, for example shredded plastics from municipal solid waste, hard converted or coarse particles of feedstock can "fall through" a reactor. The reaction volume should be selected as applied to these components but then pyrolysis of light converted particles will carry out in not optimal regime.
2. Respectively, there are not technological methods of a control of hard converted feed conversion degree.
3. Since a method of petroleum feed catalytic cracking does not foresee solid feed processing, such process stages as feed melting, separating and adsorption of hydrogen chloride are absent.

SUMMARY OF THE INVENTION

Therefore despite existence of various processes for pyrolysis there strongly felt a need in a two-stage process of waste plastics pyrolysis, ensuring elimination of the above-mentioned disadvantages of the known in the art processes.

The raised task is solved by the way that waste plastics preliminary shredded are delivered to the top of a downflow tubular reactor (downer). A hot circulating grainy inert heat carrier is also supplied into this downer from a feeder-fluidized bed apparatus, which is locate above the downer. The carrier is heated in a separate fluidized bed apparatus-combustor and is supplied in the said feeder-apparatus by a transport line. The shredded waste plastics and some quantity of inert gas entrained from the fluidized bed of the feeder are mixed with the heat carrier causing melting and pyrolysis of waste plastics in a downflow stream. Pyrolysis proseeds at a temperature between 300.degree. C. and 600.degree.C. and formed hydrocarbons residence time of 0.5 to 3 seconds producing hydrocarbon oils (the $1^{st}$ stage of the process).

The mixture of the heat carrier, pyrolysis products and the entrained inert gas enter in an upper part (freeboard) of a fluidized bed reactor placed below, where gravitational separating the solid and gaseous phases is carried out. The heat carrier and unconverted waste plastics fall down in the fluidized bed, where pyrolysis is completed (the $2^{nd}$ stage of the process).

The products of this pyrolysis stage together with the fluidizing inert gas and the entrained heat carrier particles enter the reactor freeboard and are mixed with the $1^{st}$ stage products. A combined stream of the pyrolysis products, the inert gas and the entrained heat carrier particles are subjected by additional separating in a cyclone. After that the pyrolysis products are cooled by a cooled liquid pyrolysis residue (quenching) in a transfer line and supplied in a fractionating column for final cooling and fractionating pyrolysis products.

The heat carrier is stripped by inert gas from entrained hydrocarbons in a separate fluidized bed apparatus. The stripped hydrocarbons are returned into the freeboard of the fluidized bed reactor, and the heat carrier is transported to a fluidized bed combustor, where at temperature between 600.degree.C. and 900.degree.C. it is carried out combustion of coke formed during pyrolysis. Then, the heat carrier is separated from flue gas and returned to the feeder-apparatus.

In addition to controlling the process technological regime and feed conversion degree by virtue of a change of a feed rate, temperature and heat carrier circulation rate, the following additional technological measures are employed in the present process:

a) a control of residence time in the tubular reactor by a change of a rate of inert gas entrained from the feeder; this measure is achieved by means of a control of a pressure drop between the feeder and the fluidized bed reactor, b) a change of bed height in this reactor, c) a control of temperature in this reactor by an additional stream of the hot teat carrier from the feeder-apparatus.

In addition, a possibility to supply the shredded waste plastics directly in the fluidized bed of the feeder-apparatus is foreseen for preliminary mixing with the heat carrier and melting. In this case, temperature in the fluidized bed reactor is controlled by an additional stream of the hot heat carrier supplied from the combustor via a separate transport line.

If liquid waste plastics, preliminary melted in a separate apparatus, are supplied in the tubular reactor, pyrolysis can be carried out only in the tubular reactor and be over in the freeboard of a fluidized bed apparatus placed below, where, at the same time, separating and stripping the heat carrier are carried out. If chlorinated plastics (for example polyvinyl chloride) is processed, a generated hydrogen chloride is recovered by a proper adsorbent in a separate apparatus.

Obtained liquid pyrolysis products can be used as a high quality feedstock for a fluid catalytic cracking unit.

An essence of the invention will now be explained by the accompanying drawings, in which FIG. 1 shows a schematic diagram of a two-stage pyrolysis of a shredded waste plastics in a downflow tubular reactor (downer) and after that in a fluidized bed.

DETAILED DESCRIPTION OF THE PREFERRED EMBODIMENTS

Figure 1:
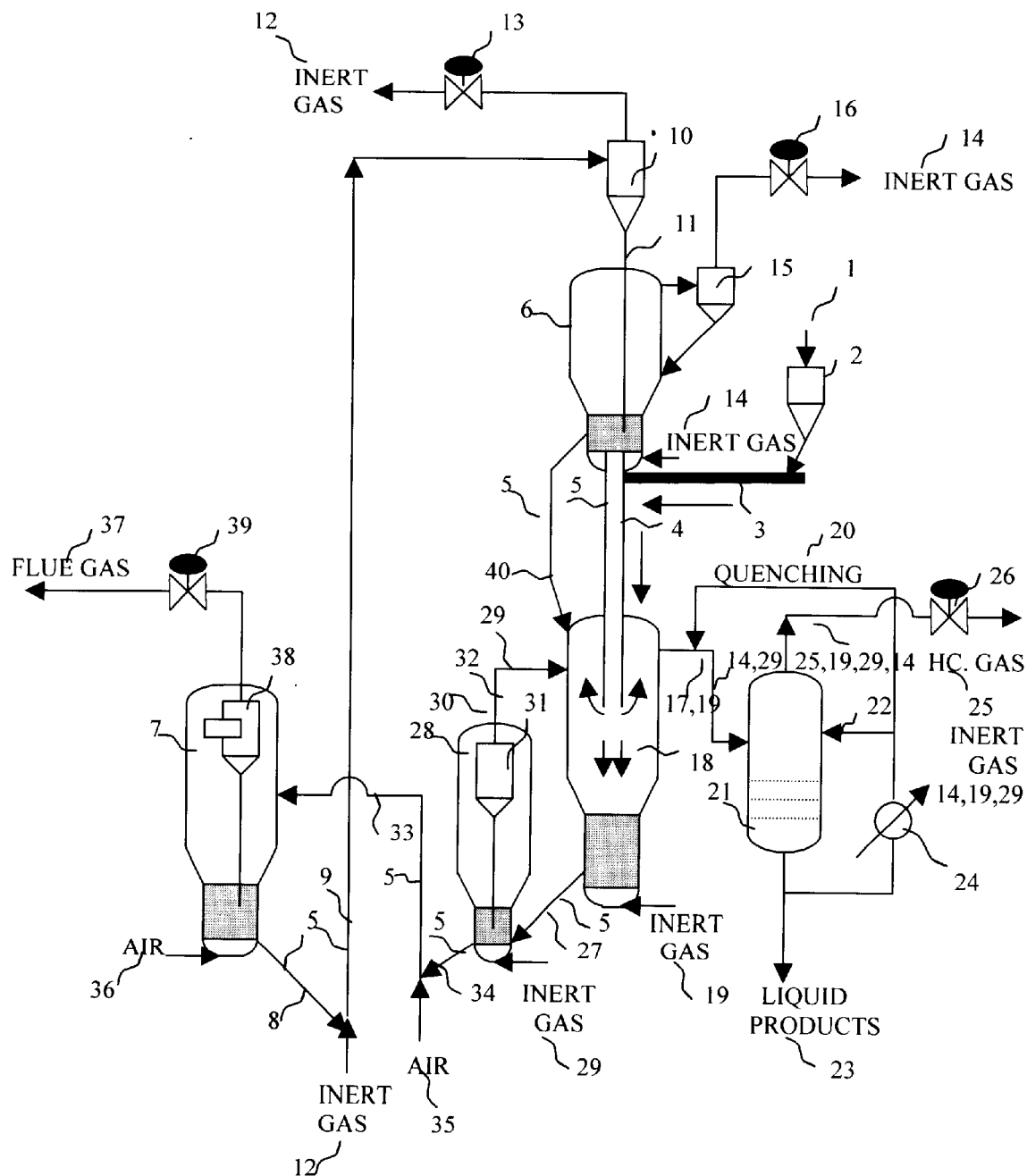

A scheme and a principle of realization of the proposed process will be explained now with reference to FIG. 1.

Preliminary shredded waste plastics 1 are introduced in the bin 2. From there they are supplied by a screw feeder 3 to the top of a downflow tubular reactor 4, where a hot circulating inert solid heat carrier 5 with temperature of 600–1000° C., preferably 700–800° C., is delivered from a fluidized bed feeder-apparatus 6. This heat carrier 5 is supplied in the apparatus 6 from a fluidized bed combustor 7 through a standpipe 8, a pneumotransport line 9 and a cyclone 10 with a dipleg 11. The heat carrier 5 is transported along the line 9 by any inert gas 12, which is separated from heat carrier in a cyclone 10, passes a valve 13 controlling pressure in the cyclone 10 and is dumped into the atmosphere. In the feeder-apparatus 6, before delivering to the downflow tubular reactor 4 the heat carrier 5 is fluidized by any oxidant-free gas 14, which is withdrawn from the apparatus 6 through a cyclone 15 and a valve 16 controlling pressure in the apparatus 6. Pressure in the apparatus 6 is kept 0 to 2 bars, preferably from 0.5 to 1 bar.

In the downflow tubular reactor 4 the shredded waste plastics 1 are mixed with the heat carrier 5, heated and melted. Simultaneously with the mixing, pyrolysis of polymers, of which waste plastics consist of, takes place at temperature of 400–900° C., preferable 450–600° C. ($1^{st}$ stage of pyrolysis). Pressure in the downflow tubular reactor 4 is equal to pressure in the apparatus 6 or is kept a bit lower. Some quantity of inert gas 14 together with the heat carrier 5 enters into the downflow tubular reactor 4 from the feeder-apparatus 6. Residence time of gas phase, consisting of formed gaseous pyrolysis products 17 and the inert gas 14, in the downflow tubular reactor 4 is from 0.5 to 3 seconds, preferable from 0.2 to 1 second.

The pyrolysis products 17, the inert gas 14 entrained from the apparatus 6, the heat carrier 5 and unconverted solid or melted waste plastics 1 enter from the downflow tubular reactor 4 to a freeboard of a fluidized bed reactor 18, where gravitational separating takes place. A main part of heat carrier particles 5, non melted waste plastics 1 and coarse droplets of melted waste plastics fall down by forces of gravity and inertia to a bed of the heat carrier 5 fluidized by any inert gas 19 supplied in the reactor 18. In the reactor 18 conversion of the waste plastics 1 is completed at temperature of 400–900° C., preferable 450–600° C. ($2^{nd}$ stage of pyrolysis). Pressure in the reactor 18 freeboard is kept equal or less a little than pressure in the feeder-apparatus 6. Residence time of heat carrier particles in the fluidized bed of the reactor 18 is from 1 minute to 10 minutes.

Products of pyrolysis in a fluidized bed, the inert gas 19 and particles of the heat carrier 5, entrained from the fluidized bed, enter the reactor 18 freeboard and are mixed there with the gas stream entered from the downflow tubular reactor 4. The mixture of the pyrolysis products 17, inert gases 14 and 19 and the entrained particles of the heat carrier 5 are subjected by additional separating in a cyclone (it does not shown on FIG. 1). Particles of the heat carrier 5 are return in the fluidized bed of the reactor 18, and the gas stream is withdrawn from the reactor 18 to a transfer line, where it is cooled by condensed and preliminary cooled liquid products of pyrolysis (quenching as marked by the numeral 20). After that, the pyrolysis products 17, quenching 20 and the inert gases 14 and 19 enter a fractionating column 21, where final cooling and condensation of liquid pyrolysis products 22 take place. A balance part of these products 23 is withdrawn from the column 21, and further, it can be used as a feedstock, for example, for the FCC process. A circulating part of the liquid products 20 is cooled in a heat exchanger 24 and is supplied in the column 21 and as quenching. Hydrocarbon gas 25 and the inert gases 14 and 19 are withdrawn from the column 21 through a valve 26 controlling pressure in the reactor 18. Further, the hydrocarbon gas 25 can be used as a fluidizing or transporting gas or be burnt in the combustor 7.

From the fluidized bed of the reactor 18 particles of the heat carrier 5 are supplied through a standpipe 27 to a fluidized bed apparatus 28, where stripping of hydrocarbons is carried out by any inert gas 29, which is also used for fluidization. The stripped hydrocarbons 30 and the inert gas 29 are separated in a cyclone 31 from entrained particles, and they are supplied through a transfer line 32 to the reactor 18 freeboard. The stripped heat carrier 5 enters in a transporting line 33 via a standpipe 34, and it is transported by air 35 to a freeboard of the combustor 7, where coke is burnt in conditions of a fluidized bed by air 36, which is also used for fluidization. Temperature in the combustor is 600–1000° C., preferably 700–800° C. Pressure in the combustor is slightly exceeds the pressure in the feeder-apparatus 6. Flue gas 37 is separated from particles entrained from the fluidized bed in a cyclone 38 and exits into the atmosphere through a valve 39 controlling pressure in the combustor 7. The burnt heat carrier 5 is withdrawn from the combustor 7 to the feeder-apparatus 6 by the above-mentioned way.

Quantity of the inert gas 14, entered the downflow tubular reactor 4 from the apparatus 6, and, respectively, residence time of the feedstock and the pyrolysis products in this reactor are controlled by a pressure drop between the feeder-apparatus 6 and the reactor 18 by virtue of the valves 16 and 26. Residence time of the unconverted plastics feed in the reactor 18 is controlled by fluidized bed height of the reactor 18. Temperature of pyrolysis in the reactor 18 can be increased by an additional stream of the heat carrier 5 delivered in the reactor 18 through a by-pass line 40. Delivering this stream of the heat carrier 5 in the freeboard of the reactor 18 before an entrance of the cyclone ("hot jet") enables more effectively to convert small droplets of melted plastics entrained from the downflow tubular reactor 4.

Figure 2:
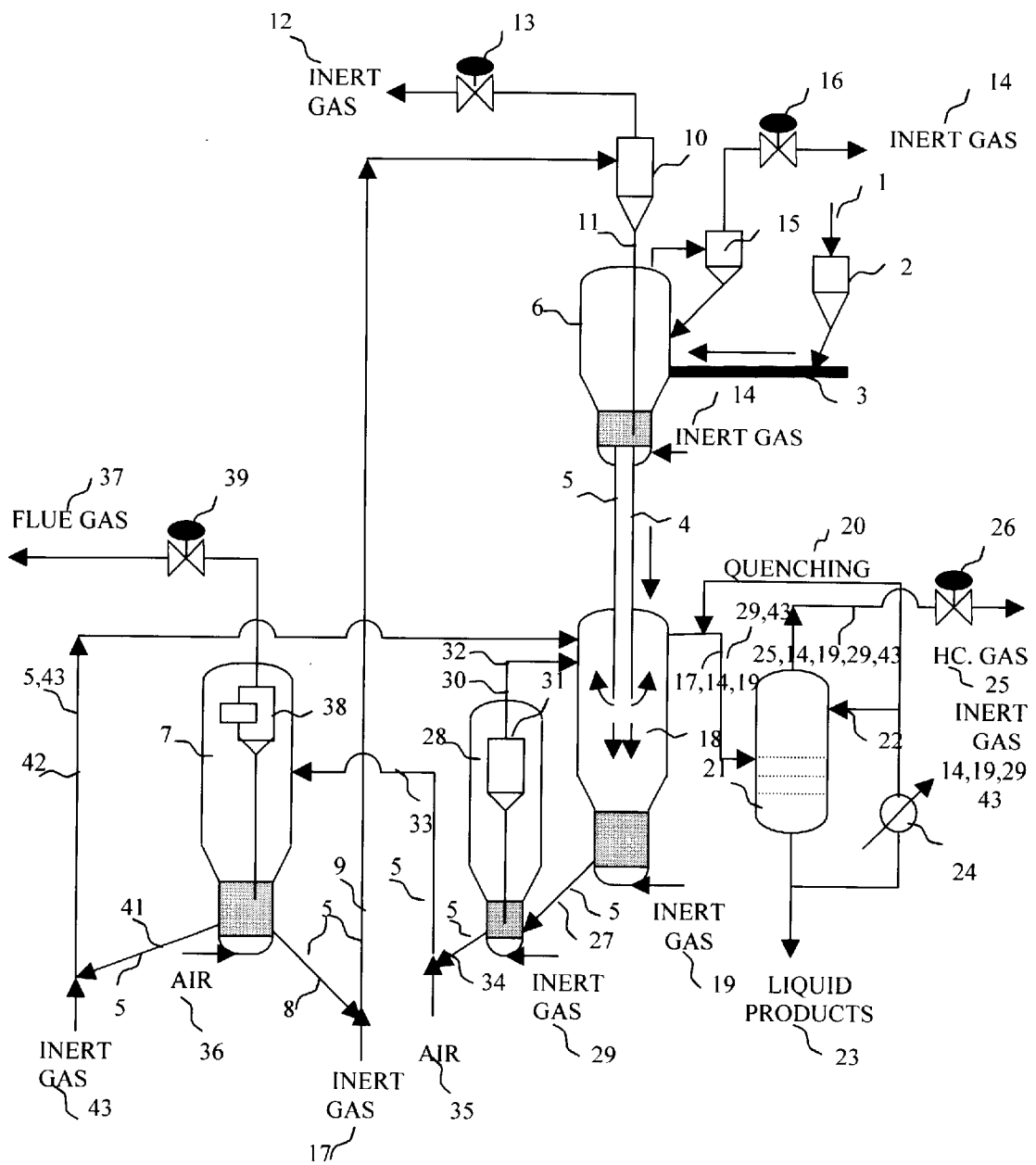
FIG. 2 depicts a schematic diagram of a two-stage pyrolysis of a shredded waste plastics at delivering the shredded plastics into a feeder-apparatus.

The shredded waste plastics 1 can be delivered instead of the downflow tubular reactor 4 in the fluidized bed of the feeder-apparatus 6, where preliminary mixing of particles of shredded waste plastics 1 and the heat carrier 5 and waste plastics melting take place (FIG. 2). In this case the additional stream of the heat carrier 5, which is necessary for increasing pyrolysis temperature in the reactor 18, is delivered in the reactor 18 from the combustor 7 through a standpipe 41 and a transport line 42. The heat carrier 5 is transported by any inert gas 43. Such scheme enable to improve mixing the feed and heat carrier particles and furthermore, to increase time, which is necessary for melting of plastics.

Figure 3:
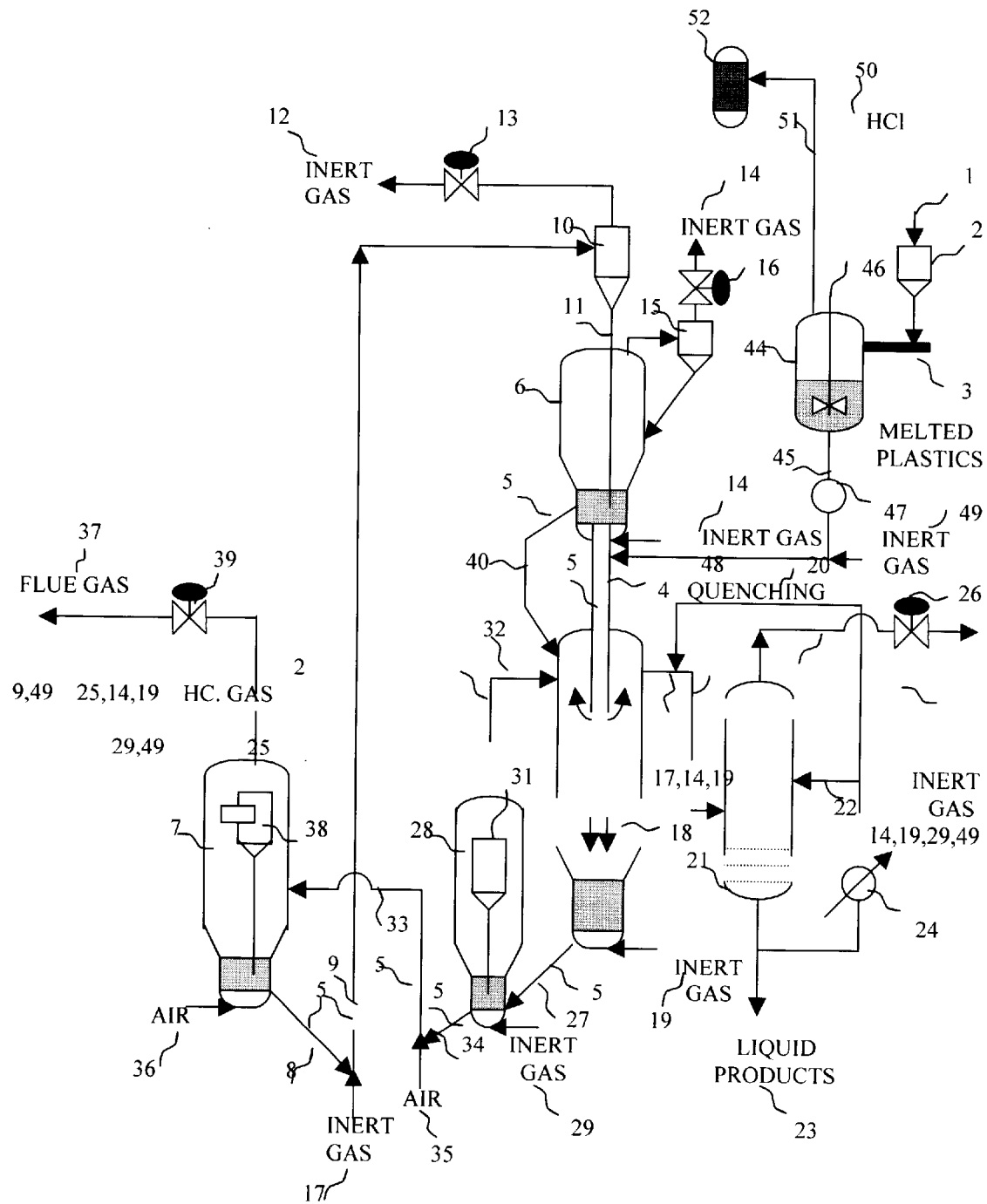
FIG. 3 is a schematic diagram of a two-stage pyrolysis of a preliminary melted waste plastics.

An alternative scheme and a principle of realization of the proposed process at preliminary melting shredded waste plastics are presented on FIG. 3. The screw feeder 3 supplies shredded waste plastics 1 from the bin 2 to an apparatus 44, where they are melted at temperature of 150–350° C., preferable 200–300° C. Heat for melting can be delivered from inner or external electrical heaters or from hot gas through a heat exchanger (not shown). A melted plastics pipe 45 is mixed by a stirring rod pipe 46, and it is introduced by a pump pipe 47 via a transfer line pipe 48 together with atomizing inert gas 49 through an atomizer to the top of the downflow tubular reactor 4. In this case, pyrolysis in the reactor 18 fluidized bed undergoes only those droplets of melting plastics, which are not converted in the downflow tubular reactor 4. Preliminary melting shredded waste plastics improves conditions of contacting of the feed and heat carrier particles and thus enables to process waste plastics containing polyvinyl chloride (PVC) more effectively. In this case, a hydrogen chloride pipe 50 evolved at melting is supplied along a transfer line pipe 51 to an adsorbing guard pipe 52 with a packed bed of adsorbent, for example calcium oxide.

Similary to solid waste plastics processing, in this scheme the quantity of the inert gas 14, supplied to the downflow tubular reactor 4 from the apparatus 6, and, respectively, residence time of the feedstock and the pyrolysis products in the downflow tubular reactor 4 are controlled by a pressure drop between the feeder-apparatus 6 and the reactor 18 by virtue of valves 16 and 26. Also, the temperature of pyrolysis in the reactor 18 freeboard can be increased by an additional stream of the heat carrier 5 delivered in the reactor 18 along a by-pass line 40.

The inventor has calculated, designed, manufactured and tested a pilot unit having capacity of 10 kg/h on feed. The pilot unit was designed according to the scheme shown on FIG. 1. In the non-limiting examples below the performances of the pilot unit are presented.

EXAMPLE 1

Technological scheme:
2-stages pyrolysis.
Reactors:
A downflow tubular reactor of 1¼" diameter of 1.8-m length, entering into a fluidized bed reactor of 4" diameter with a freeboard of 6" diameter. Height of the fluidized bed was 500 mm.
Feedstock:
Polypropylene granules of diameter from 2 to 4 mm and particle density of 840 kg/m$^3$.
Circulating heat carrier:
Sand, a fraction of 70–400 $\mu$m. Average particle diameter was 165 $\mu$m. Particle density was 2610 kg/m$^3$.
Operating conditions:
Feedstock was delivered to the top of the downflow tubular reactor.
Temperature: the downflow reactor—550° C., the fluidized bed reactor—500° C., the circulating heat carrier—700° C.
Pressure in the above-mentioned apparatus was 0.4 bar.
Residence time of a gas stream in the downflow reactor was 1.8 sec.
Residence time of the heat carrier in the fluidized bed was 7.2 min.
Duration of an experiment was 1 hour.
Products yield, in mass %:

| | |
|---|---|
| Gas, H$_2$—C$_4$: | 6.5. |
| Fraction C$_5$-200° C.: | 15.3. |
| Fraction 200–350° C.: | 13.5. |
| Residue: | 62.4. |
| Coke: | 2.3. |
| Total: | 100.0. |

EXAMPLE 2

Technological scheme:
Pyrolysis only in the downflow tubular reactor.
Reactors:
A downflow tubular reactor of 1¼" diameter of 1.8-m length, entering into a fluidized bed reactor of 4" diameter with a freeboard of 6" diameter. Height of the fluidized bed was 500 mm.
Feedstock:
Polypropylene granules of diameter from 2 to 4 mm and particle density of 840 kg/m$^3$.
Circulating heat carrier:
Sand, a fraction of 70–400 $\mu$m. Average particle diameter was 165 $\mu$m. Particle density was 2610 kg/m$^3$.
Operating conditions:
Feedstock was delivered to the top of the downflow tubular reactor.
Temperature: the downflow reactor—550° C., the fluidized bed reactor—500° C., the circulating heat carrier—700° C.
Pressure in the above-mentioned apparatus was 0.4 bar.
Residence time of a gas stream in the downflow reactor was 1.7 sec.
Residence time of the heat carrier in the fluidized bed was 0.7 min.
Duration of an experiment was 1 hour.
Products yield, in mass %:

| | |
|---|---|
| Gas, H$_2$—C$_4$: | 5.8. |
| Fraction C$_5$-200° C.: | 12.1. |
| Fraction 200–350° C.: | 13.2. |
| Residue: | 63.7. |
| Coke: | 5.2*. |
| Total: | 100.0. |

*A presence of unconverted polypropylene was observed in the circulating heat carrier at an outlet of the fluidized bed reactor.

EXAMPLE 3

Technological scheme:
  2-stages pyrolysis.
Reactors:
  A downflow tubular reactor of 1¼" diameter of 1.8 m length, entering into a fluidized bed reactor of 4" diameter with a freeboard of 6" diameter. Height of the fluidized bed was 500 mm.
Feedstock:
  Polypropylene granules with diameter from 2 to 4 mm and particle density of 840 kg/m³.
Circulating heat carrier:
  Sand, a fraction of 70–400 μm. Average particle diameter was 165 μm. Particle density was 2610 kg/m³.
Operating conditions:
  Feedstock was delivered in the fluidized bed feeder-apparatus.
Temperature: the downflow reactor—550° C., the fluidized bed reactor—500° C., the circulating heat carrier—700° C.
  Pressure in the above-mentioned apparatus was 0.4 bar.
  Residence time of a gas stream in the downflow reactor was 1.9 sec.
  Residence time of the heat carrier in the fluidized bed was 7.0 min.
  Duration of an experiment was 1 hour.
  Products yield, in mass %:

| | |
|---|---|
| Gas, $H_2$—$C_4$: | 7.2. |
| Fraction $C_5$-200° C.: | 16.8. |
| Fraction 200–350° C.: | 14.2. |
| Residue: | 59.3 |
| Coke: | 2.5. |
| Total: | 100.0. |

EXAMPLE 4

Technological scheme:
  Pyrolysis only in the downflow tubular reactor.
Reactors:
  A downflow tubular reactor of 1¼" diameter of 1.8 m length, entering into a fluidized bed reactor of 4" diameter with a freeboard of 6" diameter. Height of the fluidized bed was 500 mm.
Feedstock:
  Polypropylene granules with diameter from 2 to 4 mm and particle density of 840 kg/m³.
Circulating heat carrier:
  Sand, a fraction of 70–400 μm. Average particle diameter was 165 μm. Particle density was 2610 kg/m³.
Operating conditions:
  Feedstock was delivered in the fluidized bed feeder-apparatus.
Temperature: the downflow reactor—550° C., the fluidized bed reactor—500° C., the circulating heat carrier—700° C.
  Pressure in the above-mentioned apparatus was 0.4 bar.
  Residence time of a gas stream in the downflow reactor was 1.7 sec.
  Residence time of the heat carrier in the fluidized bed was 0.7 min.
  Duration of an experiment was 1 hour.
  Products yield, in mass %:

| | |
|---|---|
| Gas, $H_2$—$C_4$: | 6.8. |
| Fraction $C_5$-200° C.: | 15.8. |
| Fraction 200–350° C.: | 13.9. |
| Residue: | 59.8. |
| Coke: | 3.7. |
| Total: | 100.0. |

*An insignificant presence of unconverted polypropylene was observed in the circulating heat carrier at an outlet of the fluidized bed reactor.

What is claimed is:

1. A process for pyrolysis of waste plastics with hot circulating inert particulate solids to produce hydrocarbon oils, comprising the steps:

(i) supplying said hot particulates to a feeder and fluidizing said particulates with an oxygen-free gas;

(ii) delivering said hot particulates to the top of a downflow tubular reactor;

(iii) introducing shredded waste plastics to the top of said downflow tubular reactor;

(iv) melting and pyrolyzing said shredded plastics in said tubular reactor at a temperature between 300° C. and 600° C. and a residence time of 0.5 to 3 seconds to form hydrocarbon oils and gaseous pyrolysis products;

(v) separating the resulting gaseous pyrolysis products, said oxygen-free gas and said particulates in a reactor freeboard with a fluidized bed of said separated particulates, said bed being fluidized using an oxygen-free gas or circulating hydrocarbon gas, and thereafter in a cyclone separator;

(vi) pyrolyzing unconverted waste plastics in the fluidized bed of said reactor freeboard at a temperature between 300° C. and 600° C. and a residence time of 1 to 10 seconds to form hydrocarbon oils;

(vii) separating said resulting gaseous pyrolysis products formed in said fluidized bed, said oxygen-free gas and said particulates in a reactor freeboard, and thereafter in a cyclone separator;

(viii) quenching said separated gaseous pyrolysis products by preliminarily cooling said liquid pyrolysis products, and delivering a formed mixture into a fractionating column for subsequent cooling and fractionation of gaseous and liquid fractions;

(ix) stripping said particulates from said hydrocarbons using an oxygen-free gas or circulating hydrocarbon gas in a fluidized bed;

(x) delivering stripped hydrocarbons to the freeboard of said fluidized bed reactor;

(xi) burning coke formed on said particulates during pyrolysis, in a fluidized bed combustor, wherein said particulates are fluidized using air at a temperature between 600° C. and 900° C., and (xii) separating said particulates from flue gas and supplying said particulates to said feeder.

2. The process as recited in claim 1, wherein the quantity of oxygen-free gas entering said reactor from said feeder, and, respectively, the residence time of formed hydrocarbons within said reactor are controlled by differential pressure between said fluidized bed reactor and said feeder.

3. The process as recited in claim 1, wherein the residence time of the unconverted waste plastics in said fluidized bed reactor is controlled with the height of the fluidized bed.

4. The process as recited in claim 1, wherein the temperature in said fluidized bed reactor is controlled with an additional stream of hot inert particulates, said solids being delivered from said feeder through a by-pass tube.

5. The process as recited in claim 1, wherein said shredded waste plastics introduced in the fluidized bed of said feeder is mixed with said hot inert particulates and is melted there.

6. The process as recited in claim 5, wherein the temperature in the said fluidized bed reactor is controlled with an additional stream of the said circulating hot particulate solids, said solids is delivered from the said fluidized bed combustor through an additional transport line.

7. A process for pyrolysis of shredded waste plastics with hot circulating inert particulate solids to produce hydrocarbon oils, comprising the steps:

(i) supplying said hot particulates to a feeder and fluidizing said particulates with an oxygen-free gas;

(ii) delivering said particulates and oxygen-free gas from said feeder to the top of a downflow tubular reactor;

(iii) preliminarily melting said shredded waste plastics at a temperature between 150° C. and 300° C.;

(iv) introducing and atomizing said melted plastics in said tubular reactor;

(v) pyrolizing said melted plastics in at a temperature between 300° C. and 600° C. and a residence time of 0.5 to 3 seconds to form hydrocarbon oils and gaseous pyrolysis product;

(vi) separating said gaseous pyrolysis products, said oxygen-free gas and said particulates in a reactor freeboard with a fluidized bed comprising said separated inert particulate solids, using oxygen-free fluidizing gas or circulating hydrocarbon gas, and thereafter in a cyclone separator;

(vii) pyrolizing unconverted waste plastics in said reactor fluidized bed at a temperature between 300° C. and 600° C. and a residence time of 1 to 10 seconds to form hydrocarbon oils and gaseous pyrolysis products;

(viii) quenching said separated gaseous pyrolysis products by preliminarily cooling said liquid pyrolysis products, and delivering a formed mixture into a fractionating column for subsequent cooling and fractionation of gaseous and liquid fractions;

(ix) stripping said particulates by using an oxygen-free gas or said circulating hydrocarbon gas from entrained hydrocarbons in said fluidized bed;

(x) delivering stripped hydrocarbons to the freeboard of said fluidized bed reactor;

(xi) burning coke formed on said particulates during pyrolysis in a fluidized bed combustor, wherein said particulates are fluidized by air delivered at a temperature between 600° C. and 900° C.; and (xii) separating said particulates from flue gas and delivering said particulates to said feeder.

8. The process as recited in claim 7, wherein oxygen-free gas enters said tubular reactor from said feeder, and, respectively, the residence time of said hydrocarbon oils within said tubular reactor are controlled by differential pressure between said fluidized reactor and said feeder.

9. The process as recited in claim 7, wherein the stripping temperature in said fluidized reactor is controlled with an additional stream of said particulates delivered from said feeder through a by-pass tube.

10. The process as recited in claim 7, wherein said waste plastics comprise chlorinated polymers which form a hydrogen chloride during melting of said shredded waste plastics, and wherein said hydrogen chloride is recovered in an adsorber.

11. The process as recited in claim 10, wherein said adsorber includes a calcium oxide adsorbent.

* * * * *